United States Patent
Senzaki et al.

(10) Patent No.: US 12,163,057 B2
(45) Date of Patent: Dec. 10, 2024

(54) SURFACE TREATMENT LIQUID, SURFACE TREATMENT METHOD, AND METHOD FOR PRODUCING SURFACE-TREATED ROLL-SHAPED SHEET

(71) Applicant: TOKYO OHKA KOGYO CO., LTD., Kanagawa (JP)

(72) Inventors: Takahiro Senzaki, Kanagawa (JP); Takashi Kamizono, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 712 days.

(21) Appl. No.: 17/289,402

(22) PCT Filed: Sep. 12, 2019

(86) PCT No.: PCT/JP2019/035967
§ 371 (c)(1),
(2) Date: Apr. 28, 2021

(87) PCT Pub. No.: WO2020/090248
PCT Pub. Date: May 7, 2020

(65) Prior Publication Data
US 2021/0395539 A1    Dec. 23, 2021

(30) Foreign Application Priority Data

Oct. 31, 2018   (JP) ................. 2018-205681

(51) Int. Cl.
| C09D 133/26 | (2006.01) |
| C09D 7/20 | (2018.01) |
| C09D 133/06 | (2006.01) |
| C08K 5/05 | (2006.01) |

(52) U.S. Cl.
CPC ........... *C09D 7/20* (2018.01); *C09D 133/062* (2013.01); *C09D 133/26* (2013.01); *C08K 5/05* (2013.01)

(58) Field of Classification Search
CPC .................................................. C09D 133/26
See application file for complete search history.

(56) References Cited

U.S. PATENT DOCUMENTS

| 2005/0084681 A1 | 4/2005 | Levitt et al. |
| 2005/0107528 A1 | 5/2005 | Dockery et al. |
| 2016/0222248 A1 | 8/2016 | Endo et al. |
| 2020/0010689 A1 | 1/2020 | Senzaki et al. |

FOREIGN PATENT DOCUMENTS

| CN | 107353760 | 11/2017 |
| EP | 3 147 334 | 3/2017 |
| EP | 3 604 467 | 2/2020 |
| JP | H10-101986 | 4/1998 |
| JP | 2001-323207 | 11/2001 |
| JP | 2007-508446 | 4/2007 |
| JP | 2007-269932 | 10/2007 |
| JP | 2009-235565 | 10/2009 |
| JP | 2011-069817 | 4/2011 |
| JP | 2011-227246 | 11/2011 |
| JP | 2018-090663 | 6/2018 |
| WO | 2005-039770 | 5/2005 |
| WO | 2014/038004 | 3/2014 |
| WO | 2015/041208 | 3/2015 |
| WO | WO-2017172520 A1 * | 10/2017 ........... C09D 133/06 |
| WO | 2018/173508 | 9/2018 |

OTHER PUBLICATIONS

Diakoumakos et al, "Dilute aqueous base developable resists for environmentally friendly and biocompatible processes," Microelectron. Eng., 61-62 (2002) 819-827 (Year: 2002).*
Diakoumakos et al., "Negative (meth)acrylate resist materials based on novel crosslinking chemistry," Microelectron. Eng., 57-58 (2001) 539-545. (Year: 2001).*
"2-Hydroxyethyl acrylate," PubChem. (Year: 2024).*
"Properties of Acrylamide," Polysciences, Inc. (Year: 2004).*
International Search Report issued Dec. 17, 2019 in International (PCT) Application No. PCT/JP2019/035967.
Petrou et al., "A biomolecule friendly photolithographic process for fabrication of protein microarrays on polymeric films coated on silicon chips", Biosensors and Bioelectronics, 2007, vol. 22, pp. 1994-2002.
Yamamoto et al., "193 SLR System based on COMA-Acryl hybrid system", JSR Technical Review, No. 109, pp. 12-17, with English abstract.
Iihama et al., "Relationship between Component of Resins and Resistance for Water-based Gravure Inks", Journal of Printing Science and Technology, 2007, vol. 44, No. 5, pp. 279-285, with English abstract.

* cited by examiner

Primary Examiner — Catherine S Branch
(74) Attorney, Agent, or Firm — Wenderoth, Lind & Ponack, L.L.P.

(57) ABSTRACT

Provided are: a surface treatment liquid with which it is possible to conduct a surface treatment of an object to be treated, so that water, upon contact with the treated surface, rapidly spreads on and wets the surface; a surface treatment method for treating an object using the surface treatment liquid; and a method for producing a roll-shaped sheet which has been surface-treated by the surface treatment method. The surface treatment liquid comprises a polymer (A) and a solvent(S), wherein the polymer (A) comprises a constituent unit (a1) which is derived from a monomer having a log P value of 0.5 or less and which has a hydrophilic group and a constituent unit (a2) derived from a monomer that gives a homopolymer having a glass transition temperature (Tg) of 120° C. or higher, and the polymer (A) has a weight-average molecular weight of 500-20,000.

17 Claims, No Drawings

SURFACE TREATMENT LIQUID, SURFACE TREATMENT METHOD, AND METHOD FOR PRODUCING SURFACE-TREATED ROLL-SHAPED SHEET

TECHNICAL FIELD

The present invention relates to a surface treatment liquid, a method for treating a surface, and a method for producing a surface-treated roll sheet.

BACKGROUND ART

Conventionally, surfaces of various articles have been subjected to hydrophilization treatments using various surface treatment liquids in order to modify properties of the surfaces. Among the surface modifications, there is a great demand for hydrophilization of surfaces of articles, and many agents and surface treatment liquids for hydrophilization have been proposed.

As such surface treatment liquids for hydrophilization, a surface treatment liquid including predetermined amounts of a surfactant component and a stabilizer component in a solvent at a certain ratio of the surfactant component to the stabilizer component has been proposed (see Patent Document 1).

Patent Document 1: Japanese Unexamined Patent Application (Translation of PCT Application), Publication No. 2007-508446

DISCLOSURE OF THE INVENTION

Problems to be Solved by the Invention

However, surface treatment liquids according to the related art, for example, described in Patent Document 1 have a problem that it is difficult to achieve a sufficiently low water contact angle on a surface of an object to be treated immediately after water is brought into contact with the surface of the object to be treated. In other words, surface treatments using surface treatment liquids according to the related art have a problem that it takes a long time to a certain extent for a surface-treated surface of the object to be treated to be wetted with water.

The present invention has been made in view of the above problem and an object of the present invention is to provide a surface treatment liquid enabling a surface treatment by which water quickly wets and spreads over a surface-treated surface of an object to be treated when water is brought into contact with the surface-treated surface; a method for treating a surface of an object to be treated using the surface treatment liquid; and a method for producing a roll sheet surface-treated by the method for treating a surface.

Means for Solving the Problems

The present inventors have found that the above-mentioned problem can be solved by using, in a surface treatment liquid including a polymer (A) and a solvent (S), the polymer (A) which includes a constituent unit (a1) having a hydrophilic group and derived from a monomer having a Log P value of 0.5 or less and a constituent unit (a2) derived from a monomer giving a homopolymer having a glass transition temperature (Tg) of 120° C. or higher, and which has a weight average molecular weight of 500 or more and 20,000 or less. Thus, the present invention has been completed. In more detail, the present invention can provide the followings.

A first aspect of the present invention is a surface treatment liquid including a polymer (A) and a solvent (S);
the polymer (A) including a constituent unit (a1) having a hydrophilic group and a constituent unit (a2) derived from a monomer giving a homopolymer having a glass transition temperature (Tg) of 120° C. or higher;
the constituent unit (a1) being derived from a monomer having a Log P value of 0.5 or less; and
the polymer (A) having a weight average molecular weight of 500 or more and 20,000 or less.

A second aspect of the present invention is a method for treating a surface, the method including bringing the surface treatment liquid according to the first aspect into contact with a surface of an object to be treated to thereby form a coating on the surface of the object to be treated.

A third aspect of the present invention is a method for producing a surface-treated roll sheet, the method including surface-treating a sheet serving as the object to be treated by the method for treating a surface according to the second aspect; and rolling up the sheet having been surface-treated.

Effects of the Invention

According to the present invention, a surface treatment liquid enabling a surface treatment by which water quickly wets and spreads over a surface-treated surface of an object to be treated when water is brought into contact with the surface-treated surface; a method for treating a surface of an object to be treated using the surface treatment liquid; and a method for producing a roll sheet surface-treated by the method for treating a surface can be provided.

PREFERRED MODE FOR CARRYING OUT THE INVENTION

<<Surface Treatment Liquid>>

A surface treatment liquid includes a polymer (A) and a solvent (S). The surface treatment liquid is used in surface treatment for hydrophilizing a surface of an object to be treated. Essential or optional components included in the surface treatment liquid will now be sequentially described.

<Polymer (A)>

The polymer (A) includes a constituent unit (a1) having a hydrophilic group and a constituent unit (a2) derived from a monomer giving a homopolymer having a glass transition temperature (Tg) of 120° C. or higher. Therefore, the surface treatment liquid including the above-mentioned polymer (A) can be used to enable a surface treatment by which water quickly wets and spreads over a surface-treated surface of an object to be treated when water is brought into contact with the surface-treated surface. Furthermore, when the surface treatment liquid including the above-mentioned polymer (A) is used to treat the surface of the object to be treated, there is a trend that the surface of the object to be treated is less likely to be tacky (sticky).

A type of the polymer (A) is not particularly limited as long as the polymer (A) satisfies the above-mentioned predetermined requirements. The polymer (A) is preferably a polymer made of monomers having unsaturated bonds and preferably a polymer made of monomers including (meth)acrylic monomers such as (meth)acrylic acid, (meth)acrylic esters, and (meth)acrylamide from the viewpoints of many options of monomers giving the constituent unit (a1) and the constituent unit (a2); easiness of adjustment of properties of the polymer (A) by selecting structures of the constituent unit (a1) and the constituent unit (a2); and easiness of adjustment of a molecular weight of the polymer (A).

Note that, when the constituent unit (a1) is a monomer giving a homopolymer having a glass transition temperature (Tg) of 120° C. or higher, the polymer (A) does not necessarily have to include the constituent unit (a2).

[Constituent Unit (a1)]

The constituent unit (a1) has a hydrophilic group. Furthermore, the constituent unit (a1) is derived from a monomer having a Log P value of 0.5 or less. The polymer (A) that includes the constituent unit (a1) satisfying such conditions enables a surface treatment by which water quickly wets and spreads over a surface-treated surface of an object to be treated when water is brought into contact with the surface-treated surface. The Log P value, as used herein, means an octanol/water partition coefficient and can be calculated using parameters by Ghose, Pritchett, Crippen, et al. (see J. Comp. Chem., 9, 80 (1998)). This calculation can be performed using software such as CAChe 6.1 (manufactured by Fujitsu Limited).

The constituent unit (a1) is usually preferably a constituent unit derived from a monomer compound having a hydrophilic group and an ethylenically unsaturated double bond. Note that, for the monomer compound, other structures than the hydrophilic group are selected so as to give the above-mentioned Log P value of 0.5 or less.

The hydrophilic group is not particularly limited as long as the group is generally recognized as a hydrophilic group by those skilled in the art. Specific examples of the hydrophilic group include a primary amino group, a secondary amino group, a carboxy group, a phenolic hydroxyl group, a sulfonic acid group, a polyoxyalkylene group, and an alcoholic hydroxyl group. Examples of the polyoxyalkylene group include a polyoxyethylene group, a polyoxypropylene group, and a polyoxyalkylene group in which an oxyethylene group and an oxypropylene group are block- or random-bound.

Furthermore, a cationic group composed of an anion moiety and a cation moiety to be bound to the polymer (A) is also preferred as the hydrophilic group. Examples of the cation moiety constituting the cationic group include a nitrogen-containing cation moiety, a sulfur-containing cation moiety, an iodine-containing cation moiety, and a phosphorus-containing cation moiety.

An anion constituting the anion moiety is not particularly limited. A valence of the anion is not particularly limited and is preferably a monovalent anion or a divalent anion and more preferably a monovalent anion. Suitable examples of the monovalent anion serving as the anionic moiety include a halide ion, a hydroxide ion, a nitrate ion, and an organic acid ion derived from various organic carboxylic acids or organic sulfonic acids. Among them, a halide ion is preferred, a chloride ion, a bromide ion, an iodide ion, and a fluoride ion are more preferred, a chloride ion and a bromide ion are further more preferred, and a chloride ion is particularly preferred.

Preferred examples of the cationic group include a group including a quaternary ammonium base, a group including a salt of a nitrogen-containing aromatic heterocyclic group, a group including a sulfonium base, a group including an iodonium base, and a group including a phosphonium base. Among these cationic groups, the group including a quaternary ammonium base is preferred from the viewpoints of easiness of introduction into the polymer (A), a high hydrophilization effect, and the like.

The quaternary ammonium base serving as the cationic group is preferably a group represented by Formula (I) below:

$$-R^{a14}-N^+R^{11}R^{12}R^{a13}\cdot X^-  \quad (I)$$

wherein $R^{11}$, $R^{12}$, and $R^{13}$ are each independently an alkyl group having 1 or more and 4 or less carbon atoms to be bound to N+, two of $R^{11}$, $R^{12}$, and $R^{13}$ may bind to each other to form a ring, $R^{14}$ is an alkylene group having 1 or more and 4 or less carbon atoms, and $X^-$ is a monovalent anion.

The alkyl group having 1 or more and 4 or less carbon atoms serving as $R^{11}$, $R^{12}$, and $R^{13}$ may be linear or branched, but is preferably linear. Suitable specific examples of $R^{11}$, $R^{12}$, and $R^{13}$ include a methyl group, an ethyl group, an n-propyl group, and an n-butyl group.

The alkylene group having 1 or more and 4 or less carbon atoms serving as $R^{14}$ may be linear or branched, but is preferably linear. Suitable specific examples of $R^{14}$ include a methylene group, an ethane-1,2-diyl group, a propane-1,3-diyl group, and a butane-1,4-diyl group.

Suitable examples of $X^-$ are the same as the above-mentioned suitable examples of the anion constituting the anion moiety.

Examples of the monomer giving the constituent unit (a1) include a constituent unit derived from N-substituted (meth)acrylamide including an organic group having a quaternary ammonium cation group and a sulfonate anion end group. The organic group having a quaternary ammonium cation group and a sulfonate anion end group acts as the hydrophilic group in the polymer (A).

The number of the quaternary ammonium cation group and the number of the sulfonate anion group in the N-substituted (meth)acrylamide giving the constituent unit (a1) are not particularly limited. The number of the quaternary ammonium cation group and the number of the sulfonate anion group in the N-substituted (meth)acrylamide giving the constituent unit (a1) are preferably identical to each other. Preferably, the number of the quaternary ammonium cation group and the number of the sulfonate anion group in the N-substituted (meth)acrylamide giving the constituent unit (a1) are each 1 from the viewpoint of easiness of synthesis and availability of the N-substituted (meth)acrylamide giving the constituent unit (a1).

The quaternary ammonium cation group and the sulfonate anion group in the N-substituted (meth)acrylamide giving the constituent unit (a1) are present in a substituent to be bound to a nitrogen atom in (meth)acrylamide. The position of the quaternary ammonium cation group and the position of the sulfonate anion group in the substituent are not particularly limited. For example, when the substituent is a branched group having two or more side chains, the quaternary ammonium cation group may be present in at least one side chain and the sulfonate anion group may be present at an end in at least one side chain other than the side chain that the quaternary ammonium cation group is present. Furthermore, when the substituent is linear, the quaternary ammonium cation group is present at any position other than an end of a linear structure and the sulfonate anion group is present at the end of the linear structure.

The N-substituted (meth)acrylamide giving the above-mentioned constituent unit (a1) is preferably a compound represented by Formula (A1) below:

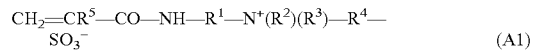

$$CH_2=CR^5-CO-NH-R^1-N^+(R^2)(R^3)-R^4-SO_3^- \quad (A1)$$

wherein $R^1$ and $R^4$ are each independently a divalent hydrocarbon group having 1 or more and 10 or less carbon atoms, $R^2$ and $R^3$ are each independently an optionally substituted hydrocarbon group having 1 or more and 10 or less carbon atoms, and $R^5$ is a hydrogen atom or a methyl group, from the viewpoints of easiness of synthesis and availability.

In Formula (A1), examples of the divalent hydrocarbon group serving as $R^1$ and $R^4$ include an alkylene group, an arylene group, and a combination of an alkylene group and an arylene group, with the alkylene being preferred. Suitable specific examples of the alkylene group serving as $R^1$ and $R^4$ include a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

In Formula (A1), examples of the hydrocarbon group serving as $R^2$ and $R^3$ include an alkyl group, an aryl group, and an aralkyl group, with the alkyl group being preferred. The hydrocarbon group serving as $R^2$ and $R^3$ may have a substituent. The substituent that the hydrocarbon group serving as $R^2$ and $R^3$ may have is not particularly limited unless it impairs the object of the present invention. Examples of the substituent include a halogen atom, a hydroxyl group, an alkoxy group having 1 or more and 4 or less carbon atoms, an acyl group having 2 or more and 4 or less carbon atoms, an acyloxy group having 2 or more and 4 or less carbon atoms, an amino group, and an alkylamino group substituted with one or two alkyl groups having 1 or more and 4 or less carbon atoms. Suitable specific examples of the alkyl group serving as $R^2$ and $R^3$ include a methyl group, an ethyl group, an n-propyl group, an iso-propyl group, an n-butyl group, an iso-butyl group, a sec-butyl group, a tert-butyl group, an n-pentyl group, an n-hexyl group, an n-heptyl group, an n-octyl group, a 2-ethylhexyl group, an n-nonyl group, and an n-decyl group.

Suitable examples of the N-substituted (meth)acrylamide represented by Formula (A1) include compounds represented by formulas below. In the formulas below, Re is a hydrogen atom or a methyl group.

[Chem. 1]

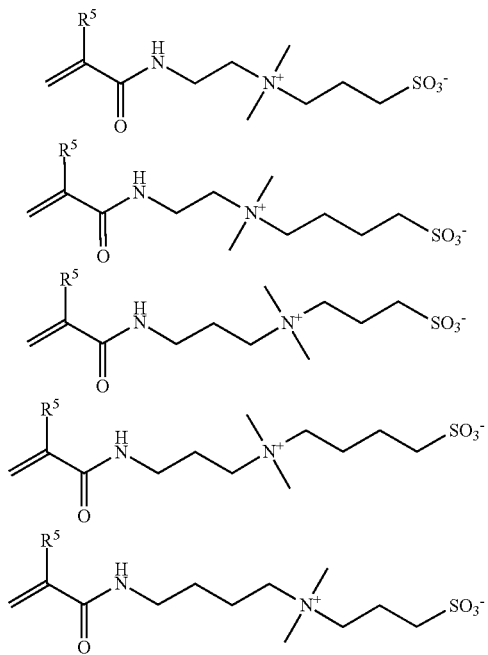

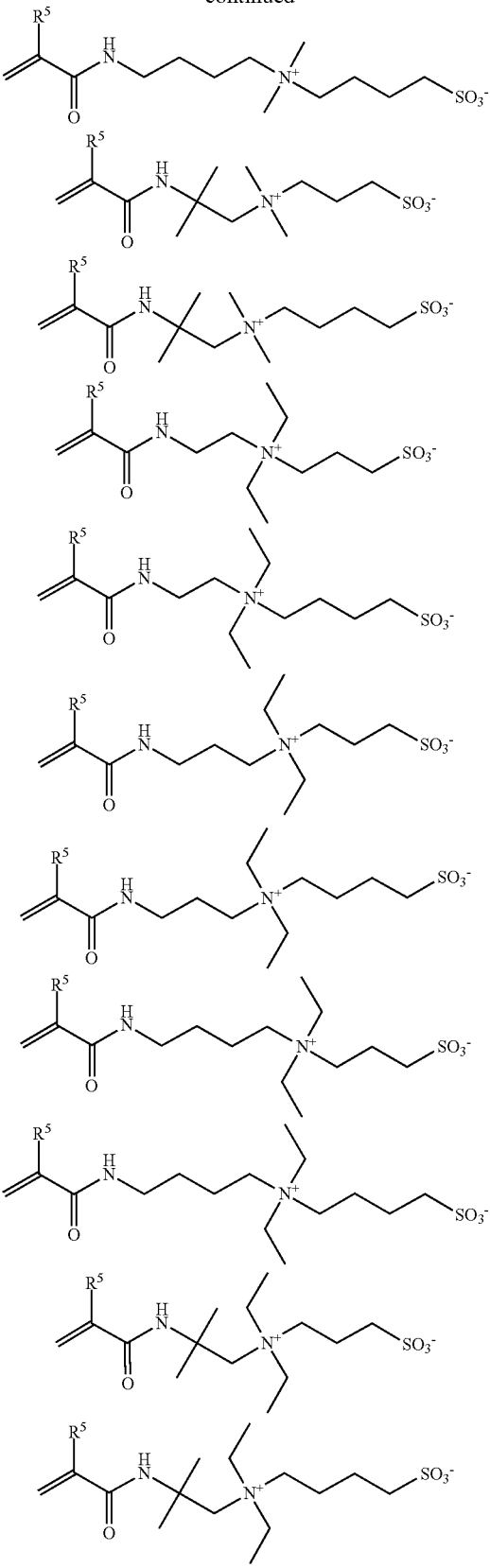

Furthermore, preferred examples of the monomer giving the constituent unit (a1) include (meth)acrylamide, N-substituted (meth)acrylamide having a hydrophilic group, and (meth)acrylic ester having a hydrophilic group. The N-substituted (meth)acrylamide having a hydrophilic group and the (meth)acrylic ester having a hydrophilic group are preferably a compound represented by Formula (A2) below:

$$CH_2=CR^{22}—CO—X—R^{21} \tag{A2}$$

wherein $R^{21}$ is an alkyl group having 1 or more and 4 or less carbon atoms substituted with one or more groups selected from the group consisting of an amino group, a sulfonic acid group, and a hydroxyl group, $R^{22}$ is a hydrogen atom or a methyl group, and X is —O— or —NH—. Preferred examples of the (meth)acrylic ester having a hydrophilic group include mono(meth)acrylate of polyalkylene glycol such as polyethylene glycol and propylene glycol, and (meth)acrylate of monoalkyl ether (e.g., methyl ether, ethyl ether, etc.) of polyalkylene glycol.

Suitable specific examples of $R^{21}$ include groups shown below.

[Chem. 2]

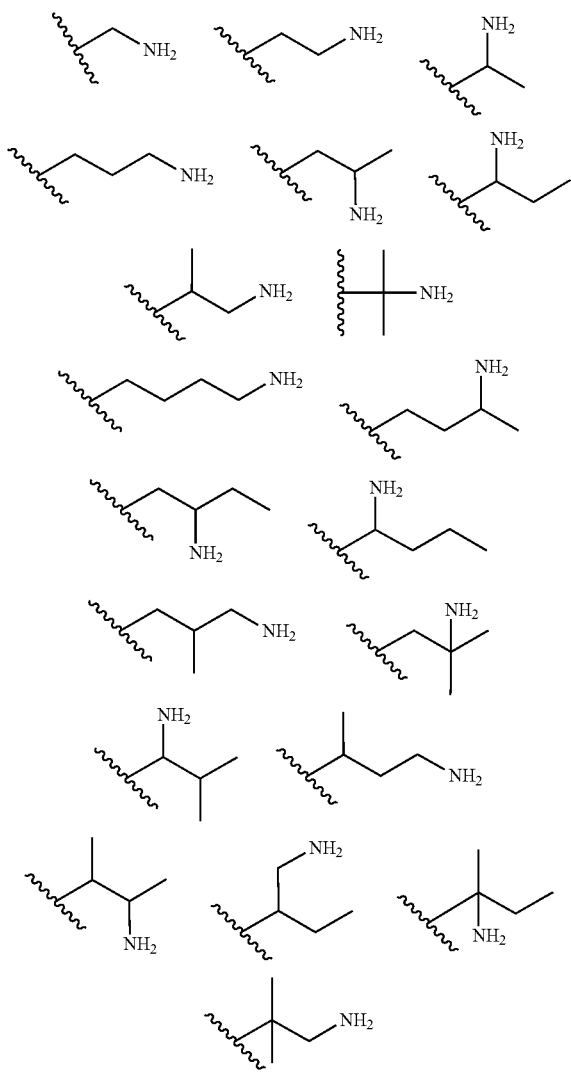

[Chem. 3]

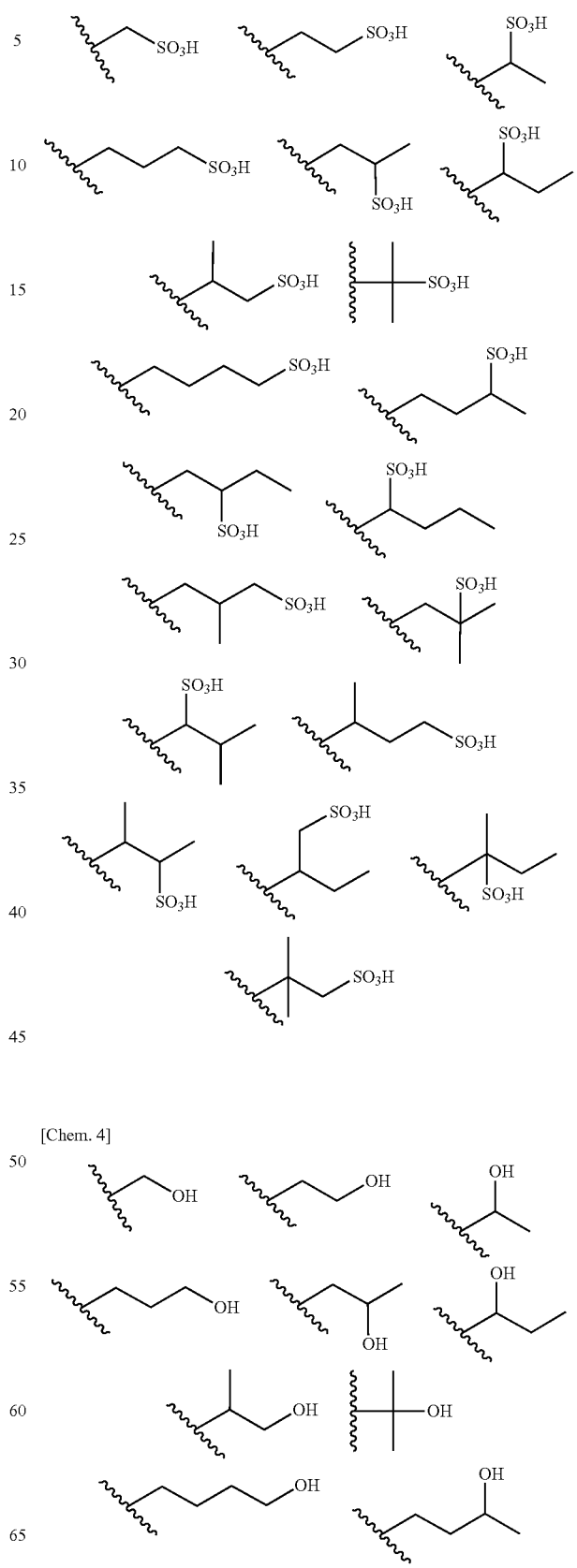

[Chem. 4]

-continued

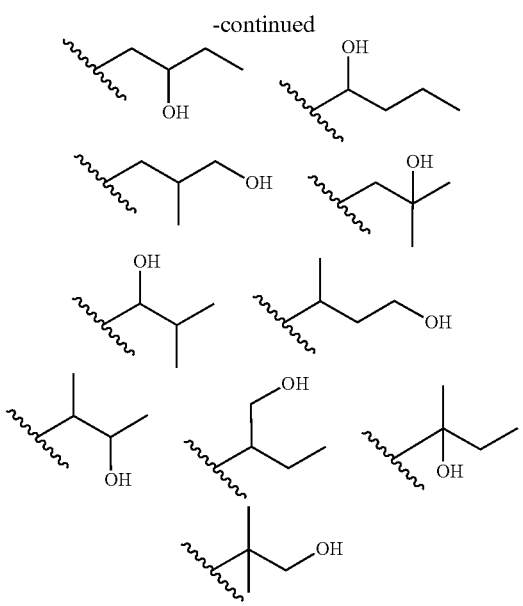

A ratio of an amount of the constituent unit (a1) to an amount of all constituent units constituting the polymer (A) is preferably 60% by mole or more and 95% by mole or less, more preferably 65% by mole or more and 90% by mole or less, and particularly preferably 758 by mole or more and 90% by mole or less since a desired effect is particularly easily obtained by the surface treatment. Note that, the amount of all constituent units constituting the polymer (A) does not include an amount of an end group derived from the below-mentioned chain transfer agent.

[Constituent Unit (a2)]

The constituent unit (a2) is a constituent unit derived from a monomer giving a homopolymer having a glass transition temperature (Tg) of 120° C. or higher. The constituent unit (a2) contributes to an effect of allowing water to quickly wet and spread over a surface-treated surface of an object to be treated. The constituent unit (a2) contributes, in particular, an effect of inhibiting the surface-treated surface of the object to be treated from being tacky. The above-mentioned glass transition temperature, as used herein, refers to a value simulated by molecular modeling software CAChe for calculating and simulating a molecular structure. For example, the glass transition temperature of a polymer is determined by MM geometry (MM2) and PM3 geometry optimization using CAChe Worksystem Pro. Version 6.1.12.33.

A monomer giving the constituent unit (a2) is not particularly limited as long as the monomer is a compound exhibiting a Tg conforming to the above-mentioned definition. The monomer giving the constituent unit (a2) is preferably a monomer having a polycyclic hydrocarbon group and more preferably (meth)acrylic ester having a polycyclic hydrocarbon group and N-substituted amide (meth)acrylate.

The polycyclic hydrocarbon group is not particularly limited as long as the group has 2 or more hydrocarbon rings. The hydrocarbon ring may be an aromatic hydrocarbon ring or an aliphatic hydrocarbon ring. The polycyclic hydrocarbon group may be a group in which one hydrogen atom is removed from polycycloalkane such as bicycloalkane, tricycloalkane, and tetracycloalkane; a group in which one hydrogen atom is removed from an aromatic hydrocarbon group formed by condensing 2 or more hydrocarbon rings such as naphthalene, tetralin, and anthracene; or a group in which one hydrogen atom is removed from a hydrocarbon compound formed by binding 2 or more cyclic hydrocarbon groups via a single bond.

Furthermore, the polycyclic hydrocarbon group may be substituted with a linear or branched alkyl group unless it impairs the object of the present invention. The number of carbon atoms in the alkyl group serving as the substituent is not particularly limited, but is preferably 1 or more and 6 or less, more preferably 1 or more and 4 or less, and particularly preferably 1 or 2.

The number of carbon atoms in the polycyclic hydrocarbon group is preferably 10 or more and 30 or less and more preferably 10 or more and 20 or less.

Suitable examples of the polycyclic hydrocarbon group include a group in which one hydrogen atom is removed from polycycloalkane such as adamantane, norbornane, isobornane, tricyclodecane, and tetracyclodecane; and a group in which one hydrogen atom is removed from a polycyclic aromatic hydrocarbon group such as a naphthalene-1-yl group, a naphthalene-2-yl group, an o-phenylphenyl group, an m-phenylphenyl group, and a p-phenylphenyl group.

Suitable specific examples of the monomer giving the constituent unit (a2) include dicyclopentanyl methacrylate, isobornyl methacrylate, and adamantyl methacrylate. The dicyclopentanyl methacrylate has a Tg value of 132.4° C. according to the above-mentioned definition. The isobornyl methacrylate has a Tg value of 120.7° C. according to the above-mentioned definition. The adamantyl methacrylate has a Tg value of 141.7° C. according to the above-mentioned definition.

A ratio of an amount of the constituent unit (a2) to an amount of all constituent units constituting the polymer (A) is preferably 5% by mole or more and 40% by mole or less, more preferably 10% by mole or more and 35% by mole or less and 10% by mole or more and 25% by mole or less since a desired effect regarding the surface treatment is particularly easily obtained. Note that, the amount of all constituent units constituting the polymer (A) does not include an amount of an end group derived from the below-mentioned chain transfer agent.

[Additional Constituent Unit (a3)]

The polymer (A) may include an additional constituent unit (a3) other than the constituent unit (a1) and the constituent unit (a2) unless it impairs the object of the present invention.

Examples of the additional constituent unit (a3) include a constituent unit derived from a monomer such as methyl (meth)acrylate, ethyl (meth)acrylate, isopropyl (meth)acrylate, n-propyl (meth)acrylate, n-butyl (meth)acrylate, isobutyl (meth)acrylate, n-pentyl (meth)acrylate, iso-pentyl (meth)acrylate, phenyl (meth)acrylate, N,N-dimethyl (meth)acrylamide, N,N-diethyl (meth)acrylamide, N,N-di-n-propyl (meth)acrylamide, N,N-di-n-butyl (meth)acrylamide, N,N-di-n-pentyl (meth)acrylamide, styrene, α-methylstyrene, ß-methylstyrene, o-methylstyrene, m-methylstyrene, p-methylstyrene, and chlorstyrene.

A ratio of the additional constituent unit (a3) to all constituent units constituting the polymer (A) is not particularly limited as long as a desired surface treatment effect is achieved. An amount of the additional constituent unit (a3) to all constituent units constituting the polymer (A) may be the balance calculated by subtracting an amount of the constituent unit (a1) and an amount of the constituent unit (a2) from an amount of all constituent units.

[Chain Transfer Agent]

The polymer (A) is preferably at least partly end-capped with a chain transfer agent from the viewpoints of easiness of adjustment of a molecular weight of the polymer (A) and feasibility of imparting properties to the polymer (A) such as adherence to the object to be treated and hydrophilicity. The chain transfer agent is not particularly limited as long as the polymer (A) can be end-capped. The chain transfer agent is preferably a mercapto compound from the viewpoint of reactivity with ends of the polymer (A). When the polymer (A) has a vinyl end group, the so-called thiol-ene reaction occurs between the mercapto compound and the vinyl end group. Such a thiol-ene reaction allows the polymer (A) to be easily end-capped.

Suitable examples of the mercapto compound that can be used as the chain transfer agent include mercaptocarboxylic acid compounds such as o-mercaptobenzoic acid, m-mercaptobenzoic acid, p-mercaptobenzoic acid, mercaptoacetic acid, 3-mercaptopropionic acid, 4-mercaptobutyric acid, 5-mercaptopentanoic acid, 6-mercapthexanoic acid, 7-mercaptheptanoic acid, 8-mercaptooctanoic acid, 2-mercaptonicotinic acid, thiomalic acid, cysteine, and N-acetylcysteine; and mercaptoalcohol or mercaptophenol such as 2-mercaptoethanol, 3-mercaptopropanol, 2-mercapto propanol, 4-mercaptobutanol, 5-mercaptopentanol, 6-mercaptohexanol, 7-mercaptoheptanol, 8-mercaptooctanol, 9-mercaptononanol, 10-mercaptodecanol, 11-mercaptoundecanol, 12-mercaptododecanol, 2-mercaptocyclohexanol, 3-mercaptocyclohexanol, 4-mercaptocyclohexanol, 1,3-dimercapto-2-propanol, thioglycerol, o-mercaptophenol, m-mercaptophenol, and p-mercaptophenol.

Furthermore, a mercaptosilane compound represented by Formula (A-I) below is also preferred as the chain transfer agent from the viewpoint of easiness of enhancement of adherence of the polymer (A) to the surface of the object to be treated:

$$HS—R^{a1}—SiR^{a2}{}_aR^{a3}{}_{3-a} \quad (A\text{-}I)$$

wherein $R^{a1}$ is a divalent hydrocarbon group having 1 or more and 20 or less carbon atoms, $R^{a2}$ is a hydroxyl group, an alkoxy group having 1 or more and 4 or less carbon atoms, or a halogen atom, $R^{a3}$ is an optionally substituted hydrocarbon group having 1 or more and 10 or less carbon atoms, and a is 2 or 3.

In Formula (A-I) above, the divalent hydrocarbon group serving as $R^{a1}$ preferably has 1 or more and 10 or less carbon atoms, more preferably 1 or more and 6 or less carbon atoms, and particularly preferably 2 or more and 4 or less carbon atoms. Examples of the divalent hydrocarbon group serving as $R^{a1}$ include an alkylene group, an arylene group, and a combination of an alkylene group and an arylene group, with the alkylene being preferred. Suitable specific examples of the alkylene group serving as $R^{a1}$ include a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

The halogen atom serving as $R^{a2}$ is, for example, a chlorine atom, a bromine atom, or an iodine atom, with the chlorine atom being preferred. Specific examples of the alkoxy group serving as $R^{a2}$ include a methoxy group, an ethoxy group, an n-propyloxy group, an iso-propyloxy group, and an n-butyloxy group, with the methoxy group and the ethoxy group being more preferred.

The hydrocarbon group serving as $R^{a3}$ is preferably an alkyl group, an aralkyl group, or an aryl group. When $R^{a3}$ is the alkyl group, the alkyl group preferably has 1 or more and 6 or less carbon atoms, more preferably 1 or more and 4 or less carbon atoms, and preferably 1 or 2 carbon atoms. Suitable examples of $R^{a3}$ in the case of the alkyl group include a methyl group, an ethyl group, an n-propyl group, an iso-propyl group, and an n-butyl group, with the methyl group and an ethyl group being more preferred. The aralkyl group is preferably a benzyl group and a phenethyl group. The aryl group is preferably a phenyl group, a naphthalene-1-yl group and a naphthalene-2-yl group, and more preferably a phenyl group.

Suitable examples of the mercapto compound represented by Formula (A-I) include (2-mercaptoethyl)trimethoxysilane, (2-mercaptoethyl)triethoxysilane, (2-mercaptoethyl)methyldimethoxysilane, (2-mercaptoethyl)ethyldimethoxysilane, (2-mercaptoethyl)methyldiethoxysilane, (2-mercaptoethyl)ethyldiethoxysilane, (3-mercaptopropyl)trimethoxysilane, (3-mercaptopropyl)triethoxysilane, (3-mercaptopropyl)methyldimethoxysilane, (3-mercaptopropyl)ethyldimethoxysilane, (3-mercaptopropyl)methyldiethoxysilane, (3-mercaptopropyl)ethyldiethoxysilane, (4-mercaptobutyl)trimethoxysilane, (4-mercaptobutyl)triethoxysilane, (4-mercaptobutyl)methyldimethoxysilane, (4-mercaptobutyl)ethyldimethoxysilane, (4-mercaptobutyl)methyldiethoxysilane, and (4-mercaptobutyl)ethyldiethoxysilane.

An amount of use of the chain transfer agent is not particularly limited as long as the polymer (A) satisfies the predetermined requirements. Usually, the amount of use of the chain transfer agent is adjusted so that a molecular weight of the polymer (A) falls within the below-mentioned predetermined range.

The polymer (A) has a weight average molecular weight of 500 or more and 20,000 or less. When the weight average molecular weight of the polymer (A) falls within such a range, a water contact angle of the object to be treated tends to quickly decrease to a desired extent after water is brought into contact with the surface-treated surface of the object to be treated. Furthermore, when the weight average molecular weight of the polymer (A) falls within such a range, there is a trend that the surface of the object to be treated is less likely to be tacky (sticky).

The weight average molecular weight of the polymer (A) is preferably 1,000 or more and 15,000 or less and more preferably 1,000 or more and 5,000 or less since a desired effect regarding the surface treatment is particularly easily obtained.

<Electrolyte (B)>

The surface treatment liquid may include an electrolyte (B). When the surface treatment liquid includes the electrolyte (B), the polymer (A) may tend to uniformly and stably dissolve in the surface treatment liquid depending on the type of the polymer (A). Note that, the electrolyte (B) is a substance other than the polymer (A). The polymer (A) that can ionize in the surface treatment liquid is not defined as the electrolyte (B), but as the polymer (A).

A type of the electrolyte (B) is not particularly limited unless it degrades the polymer (A). The type of the electrolyte (B) is not particularly limited. The electrolyte (B) may be a substance that is generally considered as a strong electrolyte such as hydrochloric acid, sodium chloride, and potassium chloride; or a substance that is generally considered as a weak electrolyte such as an anionic surfactant (e.g., sodium dodecyl sulfate) or a cationic surfactant (e.g., benzalkonium chloride).

Suitable examples of the electrolyte (B) include sodium chloride, potassium chloride, calcium chloride, magnesium chloride, magnesium sulfate, hydrochloric acid, sulfuric acid, nitric acid, and the like from the viewpoints of easy availability and low cost.

An amount of use of the electrolyte (B) is not particularly limited unless it impairs the object of the present invention and may be appropriately determined taking solubility in the surface treatment liquid into consideration. The amount of use of the electrolyte (B) is, for example, preferably 10 parts by mass or more and 200 parts by mass or less, more preferably 50 parts by mass or more and 200 parts by mass or less, further preferably 80 parts by mass or more and 200 parts by mass or less, and particularly preferably 80 parts by mass or more and 150 parts by mass or less relative to 100 parts by mass of the polymer (A).

<Other Components>

The surface treatment liquid may include various additives unless it impairs the object of the present invention. Examples of such additives include a thermal polymerization inhibitor, a photopolymerization inhibitor, an antioxidant, a UV absorber, a colorant, an antifoaming agent, and a viscosity modifier. Amounts of use of these additives are appropriately determined taking usual amounts of use of these additives into consideration.

<Solvent (S)>

The surface treatment liquid includes a solvent (S). The solvent (S) may be water, an organic solvent, or an aqueous solution of an organic solvent. The solvent (S) preferably includes water and a water-soluble organic solvent from the viewpoints of solubility of the polymer (A), safety of surface treatment operation, and low cost.

When the solvent (S) includes water and the water-soluble organic solvent, an amount of the water-soluble organic solvent included in the solvent (S) is preferably 70% by mass or more, preferably 80% by mass or more, more preferably 90% by mass or more, and particularly preferably 95% by mass or more. The water-soluble organic solvent, as used herein, refers to an organic solvent that can dissolve in water at a desired concentration at a temperature that the surface treatment liquid is used.

When the solvent (S) includes water and the water-soluble organic solvent, the water-soluble organic solvent is preferably an alcohol. When the water-soluble organic solvent is the alcohol, the polymer (A) dissolves well in the surface treatment liquid and the surface-treated surface of the object to be treated easily dries.

Examples of the alcohol include aliphatic alcohols, with an alcohol having 1 or more and 3 or less carbon atoms being preferred. Specific examples thereof include methanol, ethanol, n-propyl alcohol, and isopropyl alcohol (IPA), with methanol, ethanol, and isopropyl alcohol being preferred. The alcohol may be used alone or in combination of two or more.

The above-described components are mixed together at a desired ratio and uniformly dissolved to thereby prepare the surface treatment liquid. A concentration of the polymer (A) in the surface treatment liquid is not particularly limited as long as a desired surface treatment effect is achieved. The concentration of the polymer (A) in the surface treatment liquid is preferably 0.1% by mass or more and 40% by mass or less, more preferably 0.1% by mass or more and 30% by mass or less, and particularly preferably 0.1% by mass or more and 20% by mass or less.

A surface tension of the surface treatment liquid at 20° C. is preferably 20 mN/m or more and 35 mN/m or less from the viewpoint of wettability of the surface treatment liquid onto the surface of the object to be treated. The surface tension of the surface treatment liquid may be adjusted by, for example, adding a surfactant to the surface treatment liquid or adjusting the concentration of the polymer (A) in the surface treatment liquid.

<<Surface Treatment Method>>

A method for treating a surface includes bringing the above-mentioned surface treatment liquid into contact with a surface of an object to be treated to thereby form a coating on the surface of the object to be treated. It is believed that use of the above-mentioned surface treatment liquid allows the surface treatment liquid to quickly spread over the surface of the object to be treated when the surface treatment liquid is brought into contact with the surface of the object to be treated. It is believed that this is why a coating including the polymer (A) is quickly formed on the surface of the object to be treated to thereby achieve a sufficiently low water contact angle on the surface of the object to be treated immediately after the surface treatment liquid is brought into contact with the surface.

The surface treatment liquid is usually brought into contact with the surface of the object to be treated by an application method. The application method is not particularly limited. Specific examples of the application method include a spin coating method, a spraying method, a roller coating method, and a dipping method. When the object to be treated is a substrate, the application method is preferably the spin coating method since a coating having a uniform thickness tends to be evenly formed on a surface of the substrate. The surface of the object to be treated may be rinsed with a rinse liquid after the surface treatment liquid is applied, but it is preferable not to rinse since a coating having a desired thickness can be easily formed. The rinse liquid may be water or the organic solvent that may be used as the above-mentioned solvent (S). The rinse liquid may be an aqueous solution of the organic solvent or a mixed solution including a plurality of organic solvents.

The coating may be heated after the surface treatment liquid is applied, as necessary, to thereby remove at least a portion of the solvent (S) from the coating.

A material of the surface onto which the surface treatment liquid is applied of the object to be treated is not particularly limited and may be an organic material or an inorganic material. Examples of the organic material include various resin materials such as a polyester resin such as a PET resin and a PBT resin; various nylons, a polyimide resin, a polyamide-imide resin, a polyolefin such as polyethylene and polypropylene; polystyrene, a (meth)acrylic resin, a cycloolefin polymer (COP), a cycloolefin copolymer (COC), and a silicone resin (e.g., polyorganosiloxane such as polydimethylsiloxane (PDMS)). Furthermore, a photosensitive resin component or an alkali-soluble resin component included in various resist materials is also preferred as the organic material. Examples of the inorganic material include glass, silicon, and various metals such as copper, aluminum, iron, tungsten, etc. The metals may be alloys.

The surface of the object to be treated may be treated by introducing a hydroxyl group before the coating is formed for the purpose of enhancing adherence of the polymer (A) to the surface of the object to be treated. Examples of such a treatment include a plasma treatment with oxygen plasma, water vapor plasma, etc.

A thickness of the coating formed as mentioned above is, for example, preferably 5000 nm or less, more preferably 1 nm or more and 2000 nm or less, and particularly preferably 1 nm or more and 1000 nm or less.

For the object to be treated onto which the coating is formed as mentioned above, when water is dropped onto the surface with the coating, the surface has preferably a water contact angle of 20° or less and more preferably 15° or less two seconds after the water is dropped.

A shape of the object to be treated is not particularly limited. The object to be treated may be a flat substrate or film. The object to be treated may be, for example, three-dimensional such as spherical or columnar. Furthermore, the surface of the object to be treated may be smooth or may have regular or irregular unevenness. Examples of the object to be treated having the regular or irregular unevenness include a microchannel device and the like.

Such a microchannel device is preferably applied to, for example, a chip for diagnosis or measurement using a test liquid derived from a biomaterial. On a surface of the chip surface-treated with the above-mentioned surface treatment liquid, the test liquid derived from a biomaterial including water quickly wets, spreads over, and flows through a channel in the chip. As a result, use of the chip surface-treated with the above-mentioned surface treatment liquid easily allows accurate and rapid diagnosis or measurement using the test liquid derived from a biomaterial.

As used herein, examples of the test liquid derived from a biomaterial include blood, serum, urine, tears, saliva, and amniotic fluid, as well as diluted or concentrated solutions of these fluids.

<<Production Method of Roll Sheet>>

As mentioned above, in the case where a sheet is surface-treated with the above-mentioned surface treatment liquid, water quickly wets and spreads over a surface of the sheet when water is brought into contact with the surface of the sheet and the surface-treated surface of the sheet can be inhibited well from being tacky. Therefore, by surface-treating a sheet to be rolled up with the above-mentioned surface treatment liquid before rolling up, a roll sheet is easily produced while suppressing occurrence of a defect such as a wrinkle and a tear well during rolling up. As mentioned above, the above-mentioned surface treatment liquid is preferably used as a surface treatment liquid for surface treatment in a method for producing a surface-treated roll sheet including:

surface-treating a sheet; and rolling up the sheet having been surface-treated.

A material of the sheet formed into the roll sheet is not particularly limited. Typical examples of the material of the sheet include the resin materials mentioned above as the material of the object to be treated. A thickness of the sheet is also not particularly limited as long as it can be rolled up.

EXAMPLES

Hereinafter, the present invention will be more specifically described with reference to Examples, but the scope of the present invention is not limited to these Examples.

Preparation Examples 1 to 5

In Preparation Examples 1, 2, 4, and 5, 2-acrylamide-2-methylpropanesulfonic acid ($AAmSO_3H$) was used as a monomer giving a constituent unit (a1). The 2-acrylamido-2-methylpropanesulfonic acid has a Log P value of −0.48 according to the above-mentioned definition.

In Preparation Examples 1, 2, 4, and 5, dicyclopentanyl methacrylate (DCPMA) was used as a monomer giving a constituent unit (a2). The dicyclopentanyl methacrylate has a Tg of 132.4° C. according to the above-mentioned definition.

In Preparation Examples 2, 3, and 5, methacrylic acid (MA) was used as a monomer giving a constituent unit (a3). Note that, the methacrylic acid has a Log P value of 1.00 and Tg of 119.6° C. according to the above-mentioned definition.

In Preparation Examples 1 to 5, thioglycerol was used as a chain transfer agent.

In Preparation Examples 1 to 5, a reaction vessel was charged with monomers at a molar ratio described in Table 1 below. Furthermore, the reaction vessel was charged with the chain transfer agent at a molar ratio (total amount of monomers:chain transfer agent) of 90:10. After the reaction vessel was charged with the monomers and the chain transfer agent, a polymerization reaction was performed according to a well-known method to thereby obtain Polymers A-P1 to A-P5 having weight average molecular weights described in Table 1 below.

TABLE 1

| | Obtained polymer | Constituent unit (a1) Monomer | mole | Constituent unit (a2) Monomer | mole | Constituent unit (a3) Monomer | mole | Weight average molecular weight |
|---|---|---|---|---|---|---|---|---|
| Preparation example 1 | A-P1 | $AAmSO_3H$ | 77.8 | DCPMA | 22.2 | MA | 0 | 1500 |
| Preparation example 2 | A-P2 | $AAmSO_3H$ | 66.7 | DCPMA | 11.1 | MA | 22.2 | 1500 |
| Preparation example 3 | A-P3 | $AAmSO_3H$ | 0 | DCPMA | 0 | MA | 100 | 5000 |
| Preparation example 4 | A-P4 | $AAmSO_3H$ | 88.9 | DCPMA | 11.1 | MA | 0 | 54100 |
| Preparation example 5 | A-P5 | $AAmSO_3H$ | 77.8 | DCPMA | 11.1 | MA | 11.1 | 53200 |

Example 1, Example 2, and Comparative Examples 1 to 3

In Example 1, Example 2, and Comparative Examples 1 to 3, each polymer of which type was described in Table 2 was dissolved in a mixed solvent composed of 19% by mass of water and 80% by mass of IPA so as to give a concentration of the polymer of 1% by mass to thereby obtain a surface treatment liquid. The resultant surface treatment liquid was applied onto a surface of a polyethylene terephthalate film by a spin coating method to thereby form a coating having a thickness of 100 nm on the surface of the polyethylene terephthalate film. The surface with the coating of the polyethylene terephthalate film was evaluated for a contact angle two seconds after water was dropped according to the following method.

(Evaluation of Contact Angle)

Droplets of pure water (2.0 μL) was dropped onto the surface-treated surface of the polyethylene terephthalate film using Dropmaster 700 (manufactured by Kyowa Interface Science Co., Ltd) and a water contact angle was measured as the contact angle two seconds after water was dropped. An average value of the water contact angles at 3 positions on the polyethylene terephthalate film is described in Table 2.

TABLE 2

| | Type of polymer | Weight average molecular weight | Contact angle two seconds after water was dropped (°) |
|---|---|---|---|
| Example 1 | A-P1 | 1500 | 12 |
| Example 2 | A-P2 | 1500 | 12 |
| Comparative example 1 | A-P3 | 5000 | 44 |
| Comparative example 2 | A-P4 | 54100 | 37 |
| Comparative example 3 | A-P5 | 53200 | 33 |

It can be seen from the above table that surface treatment with the surface treatment liquid of Example 1 or 2 achieves an extremely low water contact angle even two seconds after contact with water, the liquid including Polymer A-P1 or A-P2 which includes the constituent unit (a1) and the constituent unit (a2) satisfying the predetermined requirements and which has a weight average molecular weight in a range of 500 or more and 20,000 or less. In other words, water extremely quickly wets and spreads over the surface of the object to be treated which has been surface-treated with the surface treatment liquid of Example 1 or 2.

Furthermore, it can be seen that surface treatment with the surface treatment liquid of Comparative Example 1 results in a high water contact angle two seconds after contact with water, the liquid including Polymer A-P3 which does not include the constituent unit (a1) or the constituent unit (a2) satisfying the predetermined requirements. In other words, it is difficult for water to quickly wet and spread over the surface of the object to be treated which has been surface-treated with the surface treatment liquid of Comparative Example 1.

Moreover, it can be seen that surface treatment with the surface treatment liquid of Comparative Example 2 or Comparative Example 3 results in a high water contact angle two seconds after contact with water, the liquid including Polymer A-P4 or A-P5 which includes the constituent unit (a1) and the constituent unit (a2) satisfying the predetermined requirements but which has a weight average molecular weight outside the range of 500 or more and 20,000 or less. In other words, it is difficult for water to quickly wet and spread over the surface of the object to be treated which has been surface-treated with the surface treatment liquid of Comparative Example 2 or Comparative Example 3.

The invention claimed is:

1. A surface treatment liquid comprising:
   a polymer (A); and
   a solvent (S),
     wherein the polymer (A) comprises a constituent unit (a1) having a hydrophilic group and a constituent unit (a2) derived from a monomer giving a homopolymer having a glass transition temperature (Tg) of 120° C. or higher,
     the hydrophilic group is at least one selected from the group consisting of a primary amino group, a secondary amino group, a sulfonic acid group, and a polyoxyalkylene group,
     the constituent unit (a1) is derived from a monomer having a Log P value of 0.5 or less, and
     the polymer (A) has a weight average molecular weight of 500 or more and 20,000 or less.

2. The surface treatment liquid according to claim 1, wherein the solvent (S) comprises water and a water-soluble organic solvent.

3. The surface treatment liquid according to claim 2, wherein the water-soluble organic solvent is an alcohol.

4. The surface treatment liquid according to claim 2, wherein the solvent (S) comprises 70% by mass or more of the water-soluble organic solvent.

5. The surface treatment liquid according to claim 1, wherein at least a portion of ends of the polymer (A) is capped with a chain transfer agent.

6. The surface treatment liquid according to claim 1, wherein a ratio of an amount of the constituent unit (a2) to an amount of all constituent units constituting the polymer (A) is 5% by mole or more and 40% by mole or less.

7. The surface treatment liquid according to claim 1, wherein a monomer giving the constituent unit (a2) is a monomer having a polycyclic hydrocarbon group.

8. The surface treatment liquid according to claim 1, wherein a ratio of an amount of the constituent unit (a1) to an amount of all constituent units constituting the polymer (A) is 60% by mole or more and 95% by mole or less.

9. The surface treatment liquid according to claim 1, exhibiting a surface tension of 20 mN/m or more and 35 mN/m or less at 20° C.

10. A method for treating a surface, the method comprising:
    bringing the surface treatment liquid according to claim 1 into contact with a surface of an object to be treated to thereby form a coating on the surface of the object to be treated.

11. The method for treating a surface according to claim 10, wherein the coating is not rinsed after the coating is formed.

12. The method for treating a surface according to claim 10, wherein, when water is dropped onto a surface with the coating, the surface with the coating has a water contact angle of 20° or less two seconds after the water is dropped.

13. The method for treating a surface according to claim 10, wherein the object to be treated is a chip for diagnosis or measurement using a test liquid derived from a biomaterial.

14. The method for treating a surface according to claim 10, wherein the object to be treated is a sheet.

15. A method for producing a surface-treated roll sheet, the method comprising:
    surface-treating a sheet by the method for treating a surface according to claim 14; and
    rolling up the sheet having been surface-treated.

16. The surface treatment liquid according to claim 1, wherein a monomer giving the constituent unit (a1) is an N-substituted (meth)acrylamide having a hydrophilic group and a (meth)acrylic ester having a hydrophilic group.

17. The surface treatment liquid according to claim 1, wherein a monomer giving the constituent unit (a1) is a monomer represented by the following Formula (A1):

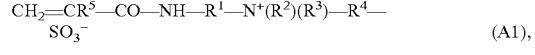

wherein $R^1$ and $R^4$ are each independently a divalent hydrocarbon group having 1 or more and 10 or less carbon atoms, $R^2$ and $R^3$ are each independently an optionally substituted hydrocarbon group having 1 or more and 10 or less carbon atoms, and $R^5$ is a hydrogen atom or a methyl group.

\* \* \* \* \*